(12) United States Patent
Black et al.

(10) Patent No.: US 9,278,761 B2
(45) Date of Patent: Mar. 8, 2016

(54) SYSTEM AND METHOD FOR INDICATING PRESSURE IN AERIAL REFUELING ASSEMBLY

(71) Applicant: The Boeing Company, Chicago, IL (US)

(72) Inventors: David Black, Renton, WA (US); Christopher Yeeles, Renton, WA (US)

(73) Assignee: The Boeing Company, Chicago, IL (US)

( * ) Notice: Subject to any disclaimer, the term of this patent is extended or adjusted under 35 U.S.C. 154(b) by 150 days.

(21) Appl. No.: 14/038,305

(22) Filed: Sep. 26, 2013

(65) Prior Publication Data

US 2015/0083864 A1    Mar. 26, 2015

(51) Int. Cl.
*B64D 39/00* (2006.01)
*B64D 47/02* (2006.01)
*B64D 47/08* (2006.01)

(52) U.S. Cl.
CPC ................ *B64D 39/00* (2013.01); *B64D 47/02* (2013.01); *B64D 47/08* (2013.01)

(58) Field of Classification Search
CPC ................................ B64D 39/00; B64D 39/06
USPC ..................................................... 244/135 A
See application file for complete search history.

(56) References Cited

U.S. PATENT DOCUMENTS

| 2,954,190 | A | | 9/1960 | Le Clair | |
|---|---|---|---|---|---|
| 2010/0213318 | A1 | * | 8/2010 | Hudson | 244/135 A |
| 2010/0217526 | A1 | * | 8/2010 | McElveen et al. | 701/300 |
| 2013/0068889 | A1 | * | 3/2013 | Richardson et al. | 244/135 A |
| 2014/0202580 | A1 | * | 7/2014 | Hutchinson | 141/1 |

FOREIGN PATENT DOCUMENTS

| WO | 2009082400 | 7/2009 |
|---|---|---|
| WO | 2010118131 | 10/2010 |

OTHER PUBLICATIONS

International Search Report, Patent Application No. PCT/US2014/052782 dated Dec. 5, 2014.

* cited by examiner

*Primary Examiner* — Christopher P Ellis
*Assistant Examiner* — Richard G Davis
(74) *Attorney, Agent, or Firm* — Kunzler Law Group, PC

(57) ABSTRACT

An aerial refueling assembly includes, for example, a pressure transducer, a processor, and one or more light sources. The processor is coupled to the pressure transducer. The one or more light sources are coupled to the processor. The pressure transducer is configured to sense a fuel pressure inside the aerial refueling assembly and to provide a signal that is indicative of the sensed fuel pressure inside the aerial refueling assembly. The processor is configured to receive the signal and to cause the one or more light sources to flash in a manner that relates to the sensed fuel pressure.

20 Claims, 4 Drawing Sheets

SYSTEM AND METHOD FOR INDICATING PRESSURE IN AERIAL REFUELING ASSEMBLY

FIELD

Some examples of the present disclosure relate to systems and methods for indicating pressure and, in particular, systems and methods for indicating pressure in an aerial refueling assembly.

BACKGROUND

During aerial refueling between two aircraft such as a tanker and a receiver, it is difficult to obtain real-time information about the aerial fueling process. If data is collected during the aerial fueling process, it is stored on a storage device mounted on the tanker. The data stored on the storage device can only be accessed and analyzed after the tanker has landed. The storage device is dismounted (e.g., unscrewed) from the tanker or the data is downloaded from the storage device by a technician on the ground. The analysis of the data might occur much later.

BRIEF SUMMARY

Some examples of systems and methods for indicating pressure, for example, in an aerial refueling assembly, substantially as shown in and/or described in connection with at least one of the figures, as set forth more completely in the claims.

Some examples provide an aerial refueling assembly. The aerial refueling assembly includes, for example, a pressure transducer, a processor, and one or more light sources. The processor is coupled to the pressure transducer. The one or more light sources are coupled to the processor. The pressure transducer is configured to sense a fuel pressure inside the aerial refueling assembly and to provide a signal that is indicative of the sensed fuel pressure inside the aerial refueling assembly. The processor is configured to receive the signal and to cause the one or more light sources to flash in a manner that relates to the sensed fuel pressure.

Some examples provide a method that determines a fuel pressure inside an aerial refueling assembly. The method includes, for example, one or more of the following: sensing, via a sensor, a fuel pressure inside an aerial refueling assembly; controlling, by a processor, one or more light sources to flash in a manner that relates to the sensed fuel pressure; receiving, via a camera, the flashing from the one or more light sources; and displaying, on a display, a view of a portion of the aerial refueling assembly including the flashing from the one or more light sources.

Some examples provide a system that determines a fuel pressure inside an aerial refueling assembly. The system includes, for example, a sensor system and a vision system. The sensor system includes, for example, a pressure transducer, a processor, and one or more light sources. The processor is coupled to the pressure transducer, and the one or more light sources are coupled to the processor. The pressure transducer is configured to sense a fuel pressure inside the aerial refueling assembly and to provide a signal that is indicative of the sensed fuel pressure inside the aerial refueling assembly. The processor is configured to receive the signal and to cause the one or more light sources to flash in a manner that relates to the sensed fuel pressure. The vision system includes, for example, a camera and a display. The flashing from the one or more light sources is captured by the camera and displayed as a video on the display.

These and other advantages, aspects and novel features, as well as details of an illustrated example thereof, will be more fully understood from the following description and drawings.

The features, functions, and advantages that have been discussed can be achieved independently in various examples or may be combined in yet other examples, further details of which can be seen with reference to the following description and drawings.

DETAILED DESCRIPTION

Some examples provide systems and methods for indicating pressure. Many specific details of certain examples are set forth in the following description as well as the drawings to provide a thorough understanding of such examples. One skilled in the art, however, will understand that there may be additional examples, or that certain of these examples may be practiced without several of the details described in the following description. Like numbers refer to like elements throughout.

Figure 1:
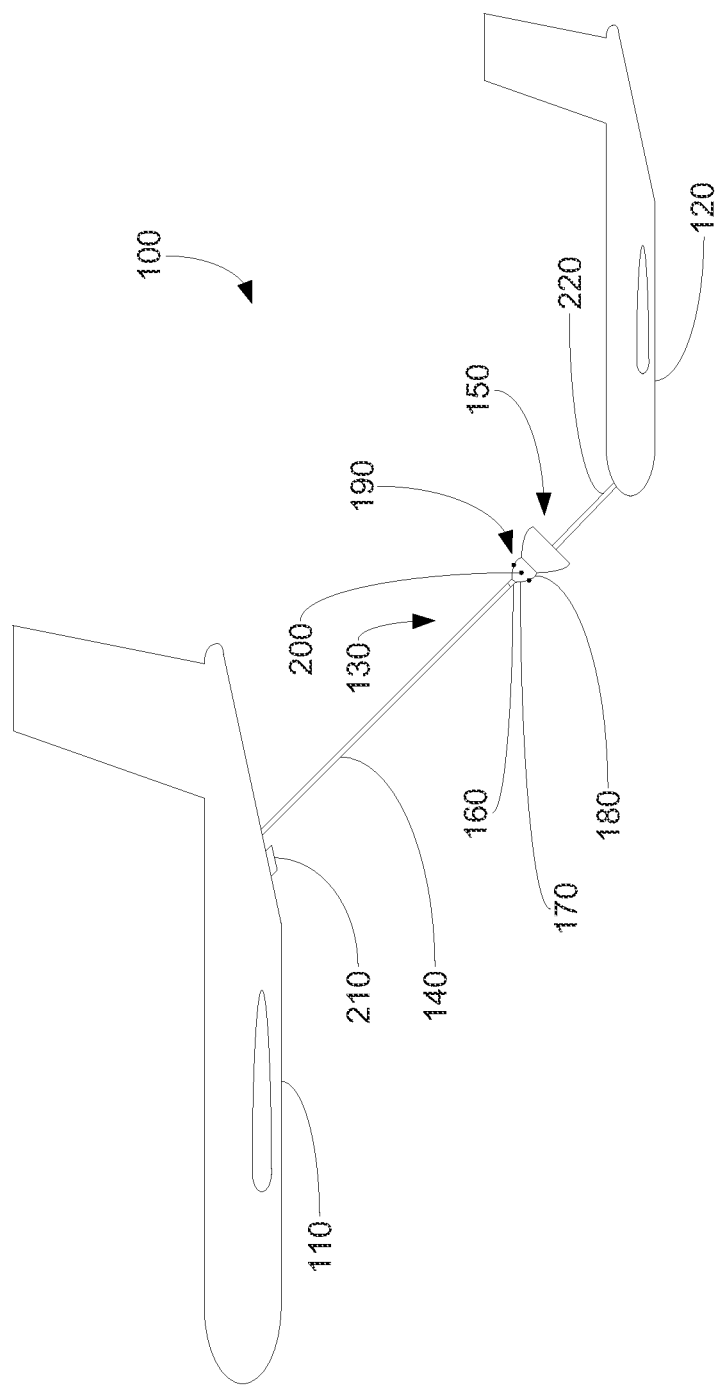
FIG. 1 shows an example of a system for aerial refueling.

FIG. 1 shows an example of a system 100 for aerial refueling. The system 100 includes, for example, a first aircraft 110 (e.g., a tanker) and a second aircraft 120 (e.g., a receiver).

Referring to FIG. 1, the first aircraft 110 includes, for example, an aerial refueling assembly 130. The aerial refueling assembly 130 includes, for example, a fuel line 140 (e.g., a fuel hose) and a drogue 150 that is attached to the fuel line 150. The fuel line 140 can be part of, for example, a hose drum unit (HDU) and can be flexible.

The drogue 150 includes, for example, a fuel valve 160, a shroud 170 and a coupler 180. The fuel valve 160 connects the drogue 150 to the fuel line 140. The coupler 180 is connected to the fuel valve 160 and is covered by the shroud 170. The drogue 150 also includes, for example, a system 190 that determines a fuel pressure, for example, inside the aerial refueling assembly 130.

The system 190 includes, for example, one or more infrared light sources 200 (e.g., one or more infrared light emitting diodes (LEDs)) that are configured to indicate the fuel pressure inside the aerial refueling assembly 130. In an example, the system 190 indicates the fuel pressure inside the coupler 180. The one or more infrared light sources 200 extend from the drogue 150. In an example, the one or more infrared light sources 200 protrude outwardly through the shroud 170. The first aircraft 110 also includes, for example, one or more cameras 210 that are configured to receive the infrared light from the infrared light sources 200. Although the one or more cameras 210 and the aerial refueling assembly 130 are shown in FIG. 1 as being located on or connected to the fuselage of the first aircraft 110, the one or more cameras 210 and/or the aerial refueling assembly 130 can be located on or connected to other parts of the first aircraft 110 such as, for example, a wing.

Referring to FIG. 1, the second aircraft 120 includes, for example, a probe 220. The probe 220 can be rigid. The probe 220 and the drogue 150 are configured to couple the probe 220 to the fuel line 140 so that fuel can be delivered from the first aircraft 110 to the second aircraft 120.

In operation, the first aircraft 110 releases (e.g., unreels) the fuel line 140 and the drogue 150 during flight. The second aircraft 120 approaches the first aircraft 110 and provides the probe 220 into the drogue 150. The drogue 150 guides the probe 220 into connection with the coupler 180. The coupler 180 grips the probe 220. While the coupler 180 is gripping the probe 220, the fuel valve 160 is opened to allow fuel to flow from the first aircraft 110 to the second aircraft 120.

The system 190 senses and determines a fuel pressure inside the aerial refueling assembly 130. In an example, the system 190 senses and determines the fuel pressure inside the coupler 180. The system 190 then flashes (e.g., turns on and off) the one or more infrared light sources 200 in a particular pattern to indicate the fuel pressure inside the coupler 180. In an example, the fuel pressure can be an indication of the status of the grip between coupler 180 and the probe 220. A strong grip or a strong physical link between the coupler 180 and the probe 220 can be indicated by a strong fuel pressure sensed by the system 190. A weak grip or a weak physical link can be indicated by a weak fuel pressure sensed by the system 190. Furthermore, a weak fuel pressure can be an indication of a malfunction in the aerial refueling assembly 130.

The flash pattern or other infrared output generated by the one or more infrared light sources 200 is received (e.g., visually captured) by the one or more cameras 210. The flash pattern or other generated infrared output received by the one or more cameras 210 is then displayed in real-time (e.g., a real-time visual indication) to personnel on the first aircraft 110 that are monitoring or in control of the aerial refueling assembly 130 and the refueling process.

Figure 2:
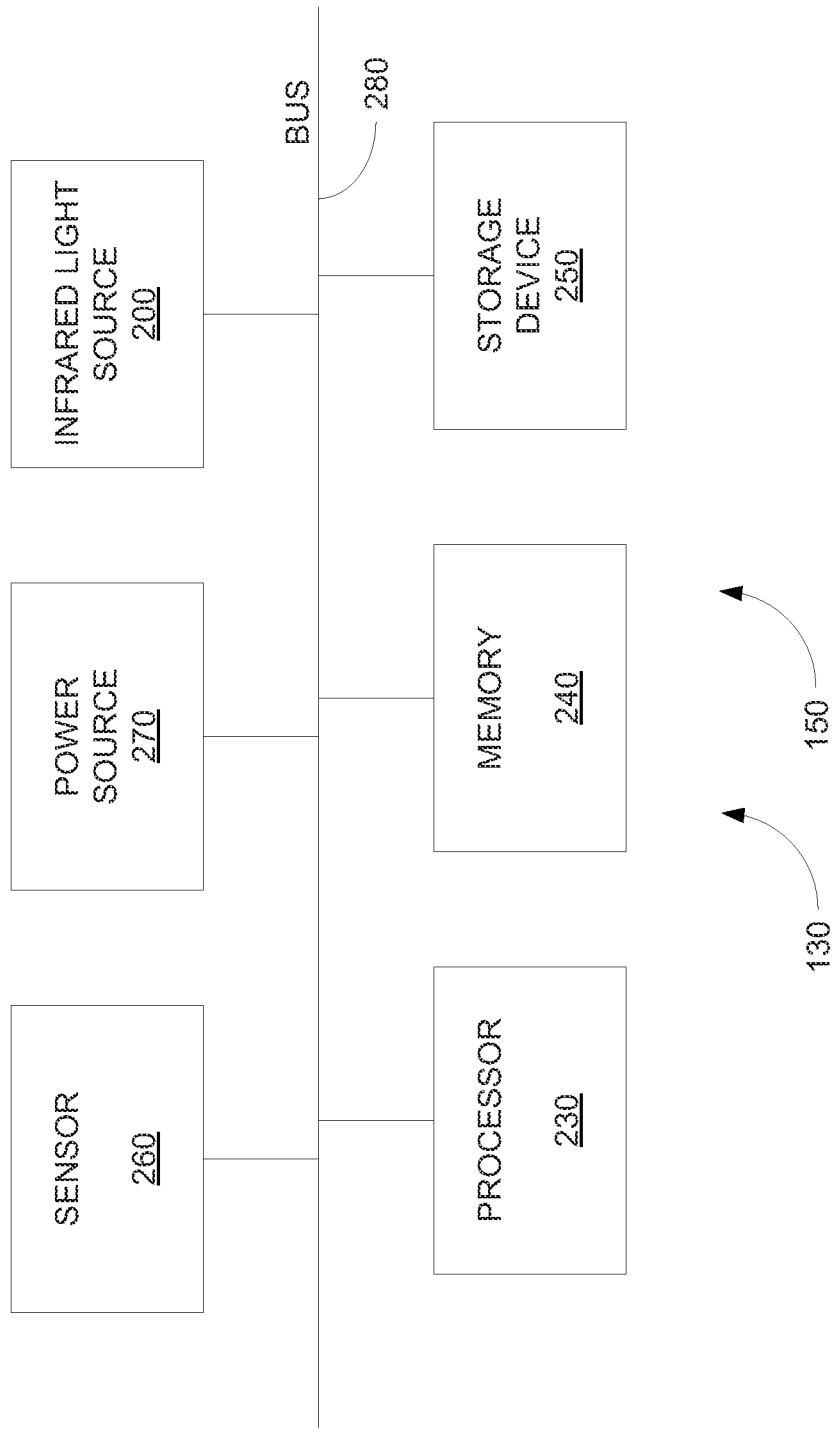
FIG. 2 shows an example of a system that determines a fuel pressure inside an aerial refueling assembly.

FIG. 2 shows an example of the aerial refueling assembly 130. Referring to FIG. 2, the aerial refueling assembly 130 includes, for example, one or more processors 230, one or more memories 240 (e.g., one or more non-transitory memories), one or more storage devices 250, one or more sensors 260, one or more power sources 270, the one or more infrared light sources 200, and one or more buses 280. The processor 230, the memory 240, the storage device 250, the sensor 260, the power source 270, and the infrared light source 200 are configured to communicate with each other over the bus 280. Some examples provide that the one or more of the components communicate with each other over cables or wires in addition to or instead of the bus 280. Some examples provide that one or more of the components wirelessly communicate with each other in addition to or instead of the bus 280. In addition, some examples provide that one or more of the components are part of a printed circuit board and/or an integrated circuit on one or more chips. In an example, at least some of the components including, for example, the sensor 260, the processor 230, and the infrared light source 200 are part of a sensor package located within the aerial refueling assembly 130 (e.g., an MA-4 aerial refueling assembly).

Data, code and/or instructions (e.g., processor-executable instructions) can be stored on the memory 240 and the code and/or instructions can be executed by the processor 230 to provide, perform or run applications, features, programs, operations, acts and/or functionality as set forth herein or as known by one of ordinary skill in the art. In an example, data, code and/or instructions can be executed by the processor 230 to configure the processor 230 to monitor or control the sensor 260, the power source 270, the infrared light source 200, the storage device 250, the memory 240, and the bus 280. For example, the processor 230 can be configured to monitor or control the sensor 260 and to control the infrared light source 200 to turn on or off (e.g., to flash) in a particular pattern that is indicative of a fuel pressure, for example, sensed by the sensor 260. The processor 230 can also be configured to perform other acts or operations as set forth herein and as known by one of ordinary skill in the art.

The sensor 260 can include, for example, a pressure transducer that is inserted or tapped into the side of the coupler 180. In an example, the fuel pressure transducer is threaded into the side of the coupler 180. The side of the coupler 180 can be, for example, a part of a hydraulic actuator that acts as an actuator to grab hold of or grip the probe 220.

The power source 270 is configured to provide power to the various components shown in FIG. 2. The power source 270 can be part of the drogue 150 or can be external to the drogue 150. The power source 270 can be, for example, one or more batteries. In addition, the power source 270 can tap an electrical generator for electrical power. Furthermore, the power source 270 can include an air-driven generator that relies on moving air as the first aircraft 110 is in flight to generate, for example, electrical power.

The infrared light source 200 can be configured to support infrared light emitting diodes (LEDs), infrared lasers, and infrared light bulbs. Infrared light, which is not visible to the naked eye and is a low-energy electromagnetic emission, can be used to reduce the detectability of the first aircraft 110 and the second aircraft 120 during aerial refueling. Some examples contemplate using other types of electromagnetic waves such as visible light, radio waves, microwaves, etc. Some examples provide for light sources such as fluorescent light sources, neon light sources, laser light sources, and incandescent light sources. Some examples contemplate using antennas and/or antenna elements to transmit and to receive electromagnetic waves.

The storage device 250 can be configured to store data received by the sensor 260. The storage device 250 can be, for example, a hard drive, an optical drive, a flash drive, a memory card, a semiconductor memory, etc. In an example, the storage device 250 can include, for example, an onboard data logger. The storage device 250 can be removable or can provide an interface so that data can be downloaded from the storage device 250. After landing, for example, a maintenance crew can remove the storage device 250 or download the data from the storage device 250 for analysis.

Figure 4:
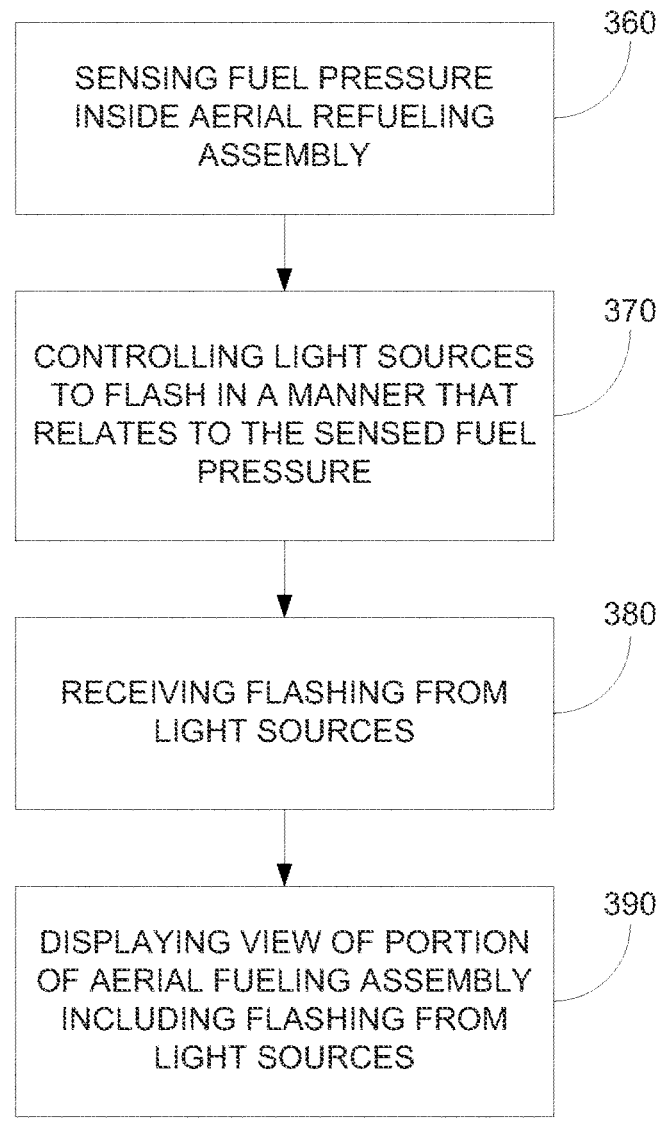
FIG. 4 shows an example of a method for monitoring an aerial refueling.

In operation and referring to FIGS. 2 and 4, the sensor 260 senses a fuel pressure in the aerial refueling assembly 130 in step 360. In an example, the sensor 260 senses the fuel pressure inside the coupler 180. The sensor 260 can include, for example, a pressure transducer that is inserted or tapped into the side of the coupler 180. In an example, the fuel pressure transducer is threaded into the side of the coupler 180. The side of the coupler 180 can be, for example, a part of a hydraulic actuator that acts as an actuator to grab hold of or grip the probe 220.

In an example, the sensor 260 senses the fuel pressure inside the coupler 180 and sends one or more signals to the processor 230 over the bus 280. The one or more signals are indicative of the sensed fuel pressure, for example. The processor 230 processes the one or more signals received from the sensor 260.

In step 370, the processor 230 controls the infrared light source 200 to flash in a manner that relates to the fuel pressure sensed by the sensor 260. In an example, the processor 230 can determine the fuel pressure inside the aerial refueling assembly 130 or, in particular, the coupler 180 from the one or more signals received from the sensor 260. Based on the determined fuel pressure, the processor 230 can cause the infrared light source 200 (e.g., infrared LEDs) to light up or flash in particular manner that is indicative of the determined fuel pressure.

For example, the processor 230 can light up or flash the infrared light source 200 periodically as a function of the sensed or determined fuel pressure. The processor 230 can be programmed to cause the infrared light source 200 to flash faster for higher fuel pressures and to flash slower for lower fuel pressures, or vice versa. Rates and/or patterns of light flashing can be determined, calculated and/or read from tables, stacks or other data structures stored in the memory 240 or storage device 250. The processor 230 can be configured to light up individual elements (e.g., infrared LEDs) of the infrared light source in a sequence and/or at a particular rate to indicate the sensed or determined fuel pressure.

In another example, the processor 230 can light up or flash all of the elements or particular elements (e.g., infrared LEDs) of the infrared light source 200 in a coded manner that is indicative of the sensed or determined fuel pressure. For example, the infrared LEDs can be disposed around the drogue 150, extending outwardly through or from the shroud 170. The processor 230 can then light up or flash the infrared LEDs sequentially around the drogue 150. Thus, clockwise or counter-clockwise flashing of the elements can be indicator of sufficient or insufficient fuel pressure. Furthermore, the rate of flashing can be an indication of an amount of fuel pressure. Other codes can be implemented that are similar to Morse code in which dots and dashes are indicated by the length of a flash of one or more infrared LEDs.

In another example, the processor 230 can light up or flash at least some of the particular elements of the infrared light source 200 to indicate other metrics in addition to the sensed or determined fuel pressure. For example, at least some of the particular elements of the infrared light source 200 can light up or flash to indicate a good grip between the probe 220 of the second aircraft 120 and the coupler 180 of the first aircraft 110.

Figure 3:
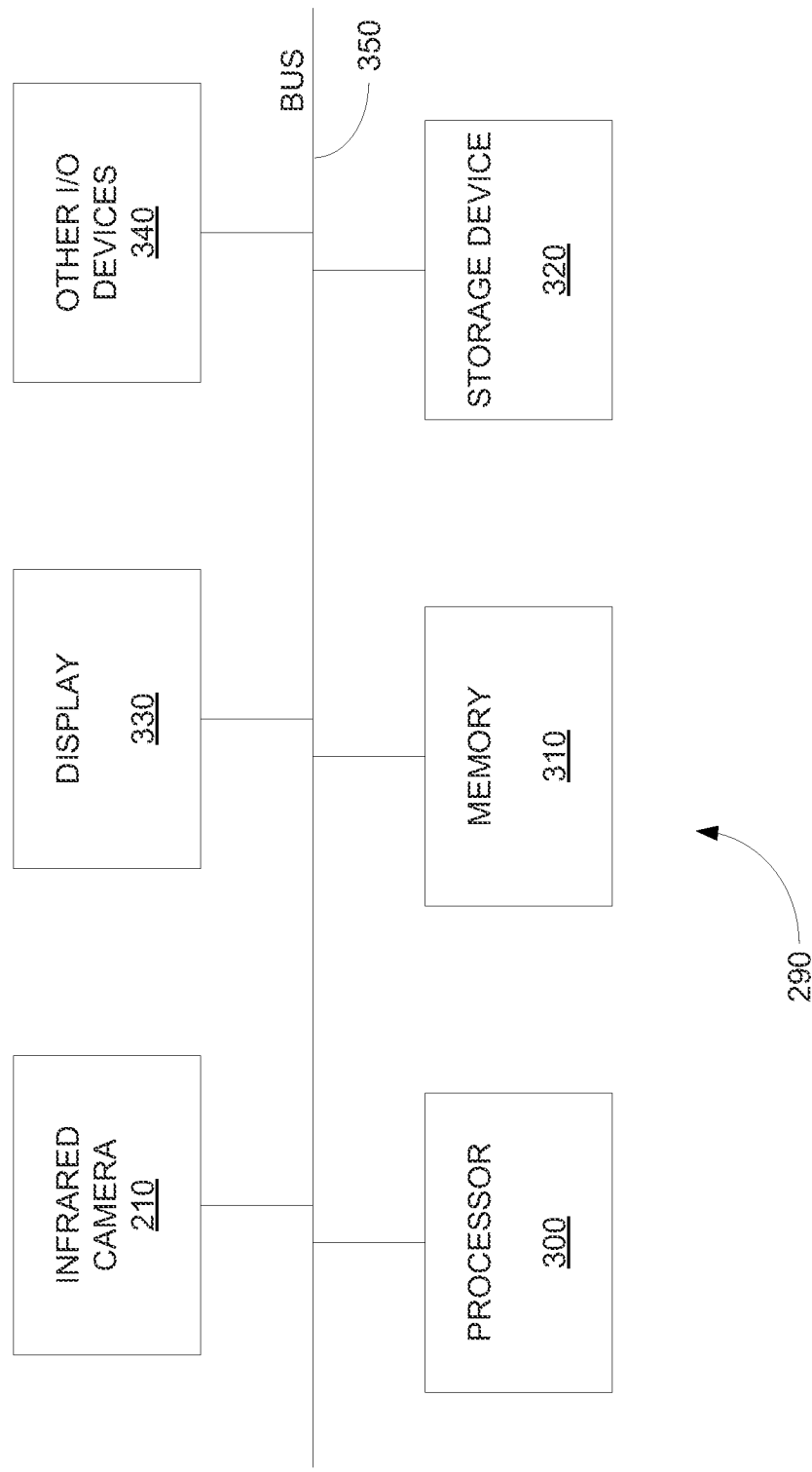
FIG. 3 shows an example of a remote system that is part of an aircraft.

FIG. 3 shows an example of a remote system 290 that is part of or located within the first aircraft 110. Referring to FIG. 3, the remote system 290 includes, for example, one or more processors 300, one or more memories 310 (e.g., one or more non-transitory memories), one or more storage devices 320, the one or more infrared cameras 210, one or more displays 330, one or more other input/output (I/O) devices, and one or more buses 350.

Data, code and/or instructions (e.g., processor-executable instructions) can be stored on the memory 310 and the code and/or instructions can be executed by the processor 300 to provide, perform or run applications, features, programs, operations, acts and/or functionality as set forth herein or as known by one of ordinary skill in the art. In an example, data, code and/or instructions can be executed by the processor 300 to configure the processor 300 to monitor or control the infrared camera 210, the display 330, the other I/O devices 340, the storage device 320, the memory 310, and the bus 350. For example, the processor 300 can be configured to monitor or control the infrared camera 210 so that the infrared camera 210 receives the light output from the infrared light source 200. The processor 300 can also be configured to perform other acts or operations as set forth herein and as known by one of ordinary skill in the art.

The processor 300, the memory 310, the storage device 320, the infrared camera 210, the display 330, and the other I/O devices are configured to communicate with each other over the bus 350. Some examples provide that the one or more of the components communicate with each other over cables or wires in addition to or instead of the bus 350. Some examples provide that one or more of the components wirelessly communicate with each other in addition to or instead of the bus 350. In addition, some examples provide that one or more of the components are part of a printed circuit board and/or an integrated circuit on one or more chips.

In an example, the infrared camera 210 is positioned on the first aircraft 110 so that the infrared camera 210 is in a direct line-of-sight with the infrared light source 200. A plurality of infrared cameras 210 can be positioned to provide multiple views (e.g., perspectives) of the drogue 150 and, in particular, the infrared light source 200, which can be, for example, a plurality of infrared LEDs spaced around or protruding through the shroud 170. In an example, the infrared camera 210 is part of a wide spectrum camera that includes the infrared spectrum and the visible spectrum. In another example, the infrared camera 210 is a dedicated infrared camera in a wide spectrum camera system that includes dedicated visible spectrum cameras as well as the infrared camera 210. In an example, the infrared camera 210 is part of an aerial refueling operator station (AROS) infrared camera system that provides real-time visual (e.g., only visual) indications of, for example, hose pressure, fuel levels, and/or fuel pressure.

The storage device 320 can be configured to store data received by the infrared camera 210 and data from the other components. The storage device 320 can be, for example, a hard drive, an optical drive, a flash drive, a memory card, a semiconductor memory, etc. The storage device 320 can be removable or can provide an interface so that data can be downloaded from the storage device 320. After landing, for example, a maintenance crew can remove the storage device 320 or download the data from the storage device 320 for analysis.

The display 330 can be configured to display the infrared output from the infrared light source 200. Since the infrared output from the infrared light source is not in the visible light spectrum, the infrared camera 210 and/or the processor 300 are configured to provide the infrared output as a visible output on the display. In an example, the infrared light source is shifted in frequency to the visible light spectrum when displayed on the display 330. The feed from the infrared camera 210 can be configured as an overlay over or under data displayed on the display 330 to provide additional information in real-time to crew monitoring the aerial refueling process.

In operation and referring to FIGS. 3 and 4, the infrared camera 210 receives the output (e.g., flashing light) from infrared light source 200 in step 380. The infrared camera 210 can provide multiple cameras that can be aligned to view the infrared light source 200 from different angles. The processor 300 can control the infrared camera 210 to change the direction, focus or other parameters of the infrared camera 210. In an example, the infrared camera 210 is an infrared video camera and provides a video feed to the processor 210 and/or the display 330. The infrared camera 210, the processor 300 and/or the display 330 converts the infrared light from the infrared light source 200 to a visible light that can be displayed on the display 330.

In step 390, the display 330 displays what the infrared camera 210 is seeing. In an example, the display 330 displays a view of at least a portion of the aerial refueling assembly including the infrared flashing from the infrared light source 200, which has been transformed into visible flashing on the display 330. The crew can then interpret the light patterns from the infrared light source 200 to determine the fuel pressure, for example, during aerial refueling. In an example, the view of the flashing or other light output from the infrared light source 200 overlays or underlays data that is shown on the display 330. Thus, for example, crew can monitor information relating to the flight as well as monitor, in real-time, the fuel pressure of the aerial refueling assembly 130 or, in particular, the coupler 180 (e.g., an MA-4 coupler assembly) during aerial refueling between the first aircraft 110 and the second aircraft 120. In an example, the fuel pressure can be an indication of the grip of the drogue 150 on the probe 220. In view of the real-time information about the grip of the drogue 150 on the probe 220, the crew can make adjustments to the flight path or the aerial refueling assembly 130, for example, to improve the grip and the flow of fuel.

Some of the components illustrated in FIG. 2 or 3 can be provided by existing systems on the first aircraft 110. Thus, for example, existing camera systems, computers, and displays can be modified in view of the descriptions herein.

Other examples may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for integrated antenna transceiver for sensor and data transmission on rotating shafts.

Accordingly, the presently disclosed examples may be realized in hardware, software, or a combination of hardware and software. The present examples may be realized in a centralized fashion in at least one computer system, or in a distributed fashion where different elements are spread across several interconnected computer systems. Any kind of computer system or other system adapted for carrying out the methods described herein is suited. A combination of hardware and software may be a general-purpose computer system with a computer program that, when being loaded and executed, controls the computer system such that it carries out the methods described herein.

The presently disclosed examples may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While described with reference to certain examples, it will be understood by those skilled in the art that various changes may be made and equivalents may be substituted without departing from the scope of the presently described examples. In addition, many modifications may be made to adapt a particular situation or material to the teachings without departing from its scope. Therefore, it is intended that the presently disclosed examples not be limited to the particular example disclosed, but rather will include all examples falling within the scope of the appended claims.

What is claimed is:

1. An aerial refueling assembly, comprising:
    a pressure transducer;
    a processor coupled to the pressure transducer;
    a fuel dispensing end portion, positionable distally from a first aircraft and configured to interface directly with a probe of a second aircraft, the probe configured to receive fuel from the first aircraft via the fuel dispensing end portion; and
    one or more light sources operably coupled to the processor and secured to the fuel dispensing end portion,
    wherein the pressure transducer is configured to sense a fuel pressure inside the aerial refueling assembly and to provide a signal that is indicative of the sensed fuel pressure inside the aerial refueling assembly,
    wherein the processor is configured to receive the signal and to cause the one or more light sources to flash in a manner that indicates a status of a grip between the fuel dispensing end portion and the probe of the second aircraft.

2. The aerial refueling assembly according to claim 1, wherein the one or more light sources include one or more light emitting diodes.

3. The aerial refueling assembly according to claim 1, wherein the one or more light sources include one or more infrared light emitting diodes.

4. The aerial refueling assembly according to claim 1, wherein the processor is configured to receive the signal and to cause the one or more light sources to flash at a rate that indicates a status of a grip between the fuel dispensing end portion and the probe of the second aircraft.

5. The aerial refueling assembly according to claim 1, wherein the processor is configured to receive the signal and to cause the one or more light sources to flash in a pattern that relates to the sensed fuel pressure.

6. The aerial refueling assembly according to claim 1, wherein the pressure transducer is configured to sense a fuel pressure inside a drogue assembly of the aerial refueling assembly and to provide a signal that is indicative of the sensed fuel pressure inside the drogue assembly of the aerial refueling assembly.

7. The aerial refueling assembly according to claim 1, wherein the one or more light sources include one or more of the following: a fluorescent light source, a neon light source, a laser light source, and an incandescent light source.

8. A method for determining a fuel pressure inside an aerial refueling assembly, comprising:
    sensing, via a sensor, a fuel pressure inside an aerial refueling assembly;
    controlling, by a processor, one or more light sources to flash, the one or more light sources secured to a fuel dispensing end portion of the aerial refueling assembly, the fuel dispensing end portion being positionable on the aerial refueling assembly distally from a first aircraft and configured to interface directly with a probe of a second aircraft to provide fuel from the first aircraft to the second aircraft, wherein the processor controls the one or more light sources to flash in a manner that indicates a status of a grip between the fuel dispensing end;
    receiving, via a camera, the flashing from the one or more light sources; and
    displaying, on a display, a view of a portion of the aerial refueling assembly including the flashing from the one or more light sources.

9. The method according to claim 8, wherein the one or more light sources include one or more infrared light emitting diodes.

10. The method according to claim 8, wherein the one or more light sources include one or more infrared light sources.

11. The method according to claim 8, comprising:
    sending a signal to the processor, wherein the signal is related to the sensed fuel pressure; and processing the signal by the processor to output another signal that causes the one or more light sources to flash at rate that relates to the sensed fuel pressure.

12. The method according to claim 8, comprising:
sending a signal to the processor, wherein the signal is related to the sensed fuel pressure; and
processing the signal by the processor to output another signal that causes the one or more light sources to flash in a pattern that relates to the sensed fuel pressure.

13. The method according to claim 8, wherein the sensed fuel pressure inside the aerial refueling assembly is the fuel pressure inside a drogue assembly of the aerial refueling assembly.

14. A system for determining a fuel pressure inside an aerial refueling assembly, comprising:
a sensor system that includes a pressure transducer, a processor, one or more light sources, and a fuel dispensing end tethered to a first aircraft, positionable distally from the first aircraft, and configured to interface directly with a probe of a second aircraft to provide fuel to the second aircraft from the first aircraft, wherein the processor is coupled to the pressure transducer, wherein the one or more light sources are coupled to the processor and secured to the fuel dispensing end, wherein the pressure transducer is configured to sense a fuel pressure inside the aerial refueling assembly and to provide a signal that is indicative of the sensed fuel pressure inside the aerial refueling assembly, wherein the processor is configured to receive the signal and to cause the one or more light sources to flash in a manner that indicates a status of a grip between the fuel dispensing end and the probe of the second aircraft; and
a vision system that includes a camera and a display, wherein the flashing from the one or more light sources is captured by the camera and displayed as a video on the display.

15. The system according to claim 14, wherein the flashing displayed on the display is a real-time indication of fuel pressure in a drogue assembly of the aerial refueling assembly.

16. The system according to claim 14, wherein the sensor system is part of a drogue assembly of the aerial refueling assembly.

17. The system according to claim 14, wherein the one or more light sources include one or more infrared light emitting diodes.

18. The system according to claim 14, wherein the one or more light sources include one or more infrared light sources.

19. The system according to claim 14, wherein the processor is configured to receive the signal and to cause the one or more light sources to flash at a rate that relates to the sensed fuel pressure of a drogue assembly of the aerial refueling assembly.

20. The system according to claim 14, wherein the processor is configured to receive the signal and to cause the one or more light sources to flash in a pattern that relates to the sensed fuel pressure of a drogue assembly of the aerial refueling assembly.

* * * * *